United States Patent [19]

Peterson et al.

[11] 4,040,693
[45] Aug. 9, 1977

[54] GALLEY UNIT

[75] Inventors: Edward W. Peterson, Lake Bluff; Charles J. Bednar, Oak Park, both of Ill.

[73] Assignee: Arctic Enterprises, Inc., Thief River Falls, Minn.

[21] Appl. No.: 589,337

[22] Filed: June 23, 1975

[51] Int. Cl.² .................. A47B 77/08; A47B 85/04
[52] U.S. Cl. ............................ 312/236; 312/237; 297/123
[58] Field of Search ............. 312/235, 241, 229, 236, 312/237, 314, 317; 297/123, 2, 244, 92; 5/5, 4, 12 R

[56] References Cited

U.S. PATENT DOCUMENTS

| 519,930 | 5/1894 | Still | 5/58 X |
|---|---|---|---|
| 1,214,019 | 1/1917 | Dostert | 297/123 |
| 1,309,097 | 8/1919 | Markwick | 297/123 |
| 3,379,471 | 4/1968 | Dalziel | 297/244 |
| 3,722,011 | 3/1973 | Miller | 312/237 |
| 3,823,992 | 7/1974 | Corbett | 312/236 |
| 3,873,114 | 3/1975 | Brown | 312/237 |

FOREIGN PATENT DOCUMENTS 63,404 6/1934 Netherlands .................. 297/123

Primary Examiner—Paul R. Gilliam
Assistant Examiner—Victor N. Sakran
Attorney, Agent, or Firm—Allegretti, Newitt, Witcoff & McAndrews

[57] ABSTRACT

A multi-purpose galley assembly for use on boats, recreational vehicles, trailers, camper trailers, and the like. The galley assembly has an upright base with cabinets below and a kitchen unit, including a stove and range in the upper portion thereof. A pair of seats are hingedly mounted on the lateral outer edges of the upright base. The seats substantially cover said sink and said range, and the back portions of the seats are in back to back relationship, while the assembly is in the first position. The seats may be pivoted outwardly and downwardly in such a way that the seat portions of the seats define work surfaces which are positioned laterally of the kitchen unit while the back portions support the seat portions in the substantially horizontal position when the seat portions are being used as work surfaces.

2 Claims, 4 Drawing Figures

GALLEY UNIT

BACKGROUND OF THE INVENTION FIELD OF THE INVENTION and DESCRIPTION OF THE PRIOR ART This invention relates to a galley or kitchen unit which is so designed as to provide multiple uses when the galley is not being used and it particularly relates to such galley units as used on boats and recreational vehicles and the like.

In various types of land and water vehicles, such as boats, trailers, recreational vehicles, campertrailers, and the like, space is at a premium. For this reason, it is common for certain of the functional equipment to have multiple functions. For example, daytime seats become beds at night. Daytime tables and seats become beds at night. Although the desireability of having multiple functions for equipment and/or structures used in recreational water and land vehicles is well known, certain functional or structural equipment has not generally been used for anything but the intended purpose.

One type of equipment commonly found in boats, trailers, and the like is a galley. A galley or kitchen unit, generally has no purpose other than for cooking or for washing. When not being used, which is the majority of the time, the galley takes up valuable space in the boat or vehicle. Therefore, any way in which the galley unit can be converted to other uses, when not in use, would be considered highly desirable.

SUMMARY OF THE INVENTION

It is the primary object of the present invention to provide a galley unit which can be used in boats, trailers, recreational vehicles, camper-trailers, and the like, wherein the galley unit has multiple functions, both when the galley unit is being used and when not being used.

It is also an object of this invention to provide a galley unit which functions as a stove and/or sink, when used, and as a seat or bed when not being used.

It is another important object of this invention to provide an improved galley unit for use on boats, campers and the like wherein the galley unit functions as a seat and/or bed arrangement, when not in use, and when in use, the seating arrangement provides a work surface adjacent the galley unit.

It is a further object of this invention to provide a highly compact galley unit having multiple purposes, including use as a bed and/or seat, when the galley is not in use, wherein the unit is particularly characterized by its simplicity in construction and usefulness both when the galley unit is being used as a kitchen unit and when not being so used.

Further purposes and objects of this invention will appear as the specification proceeds.

The foregoin objects are accomplished by providing an improved multi-purpose galley assembly, particularly useful in boats, campers, recreational vehicles, camper-trailers, and the like, wherein the assembly includes an upright base having an upper portion with a kitchen unit located in the upper portion and cabinets in the lower portion thereof; a seat unit is interconnected to the upper portion of the base, with the seat unit having a first position for covering at least a portion of the kitchen unit so as to function as a seat for supporting a person, and a second position for defining a work surface adjacent the kitchen unit.

BRIEF DESCRIPTION OF THE DRAWINGS

One particular embodiment of the invention is illustrated in the accompanying drawings wherein.

DETAILED DESCRIPTION OF THE PREFERRED EMBODIMENT

Figure 1:
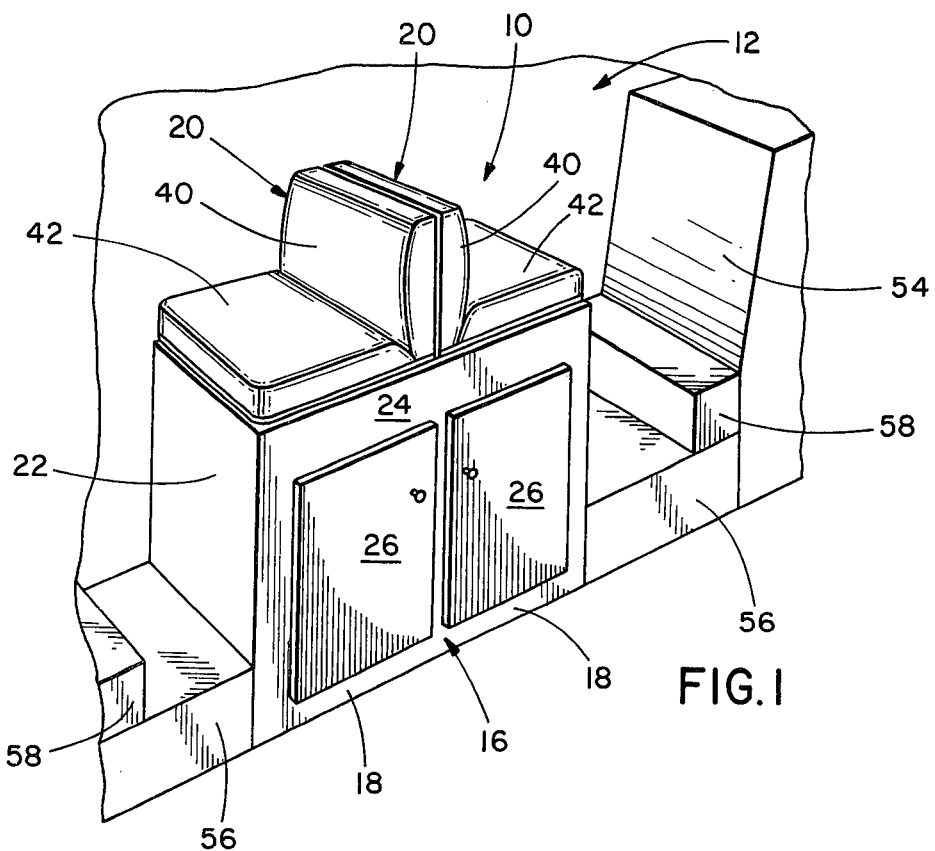
FIG. 1 is a broken pictorial view of my improved galley unit, when the unit is functioning as a seating arrangement.
Figure 3:
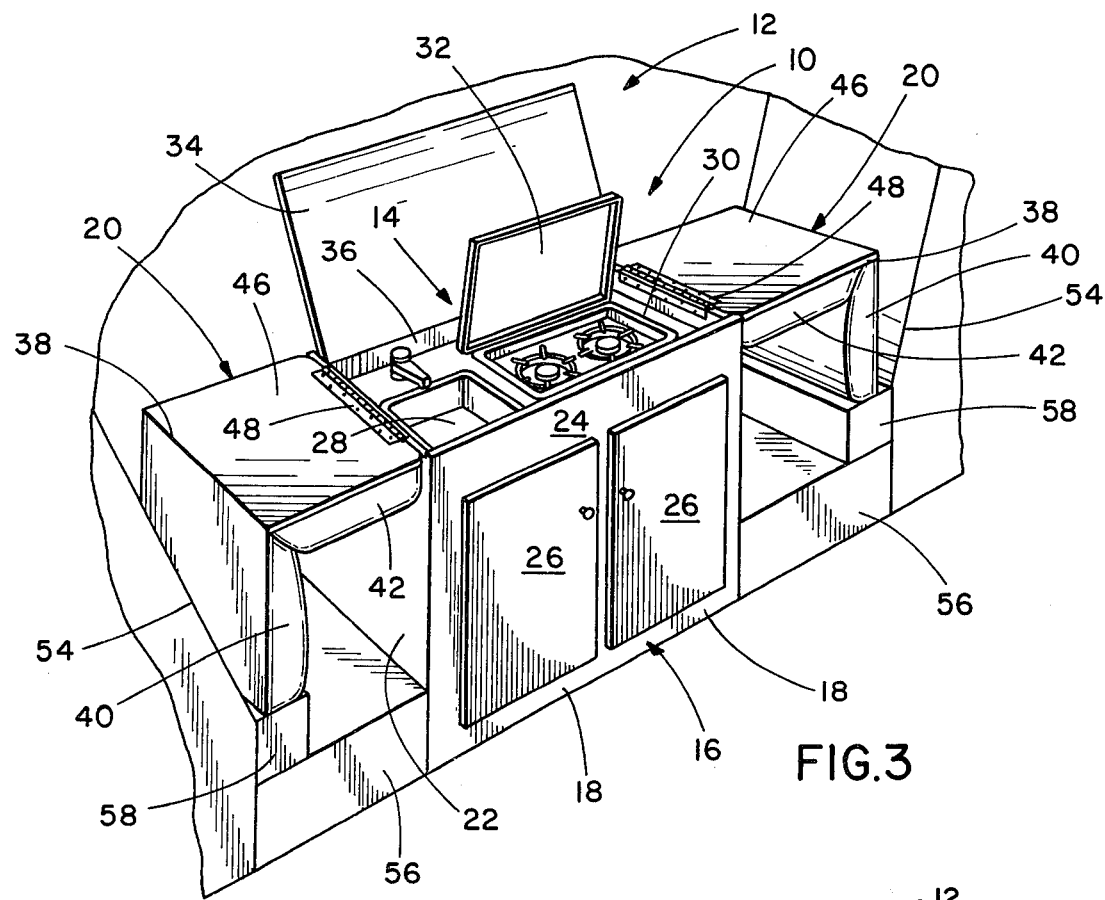
FIG. 3 is a perspective view of the galley unit, similar to the view of FIG. 1, but showing the unit in the position of FIG. 2 wherein the galley unit functions as a sink and/or range, while the seats function as work surfaces.

Referring to FIG. 1, my improved galley assembly, generally 10, is shown in a boat hull, generally 12, or the like, when in position for use as a seating arrangement. Referring to FIG. 3, the galley assembly 10 is shown in position when the kitchen unit, generally 14, thereof is in position for use. Although it is indicated herein that the galley unit 10 is positioned within the boat hull 12, it is to be understood that the galley unit 10 may be used in a wide variety of land vehicles, as well, including trailers, camper-trailers, recreational vehicles, and the like.

The galley assembly 10 generally includes a central support, generally 16, having the kitchen unit 14, in the upper portion thereof, and cabinets 18 in the space below the kitchen unit 14. The unit 10 includes a pair of seat members 20, hingedly interconnected to the opposite lateral edges of the central support 16. Referring to FIG. 3, the central support 16 includes opposites side walls 22, and a front wall 24 for rigidly interconnecting the side walls 22. A pair of hinged doors 26 are mounted on the front wall 24 in order to provide access to the storage space or cabinet portion 18 within the lower portion of the central support 16, below the kitchen unit 14.

The kitchen unit 14 desirably includes a sink 28, and a two burner range 30. The sink 28 and range 30 are desireably placed in side-to-side relationship. Preferably, a metal cover plate 32 is hingedly connected along the rear portion of the area of the range 30, and is movable from the substantially upright position, shown in FIG. 3, to a closed position for covering the burners on the range 30. In the closed position, the cover plate 32 also may function as a drain board, when the sink 28 is being used. As seen best in FIG. 3, the sink 28 and range 30 are desirably recessed below the upper edges of the side walls 22 and front wall 24. The recessed portion above the range 30 and sink 28 is preferably enclosed by a cover board 34 which is hingedly connected to the rear upright wall or support 36, of the central support 16. The cover board 34, as will be shown, provides additional uses for the galley unit 10, incluling use as a cot arrangement and as a seating arrangement, as will be hereinafter described in greater detail.

Figure 2:
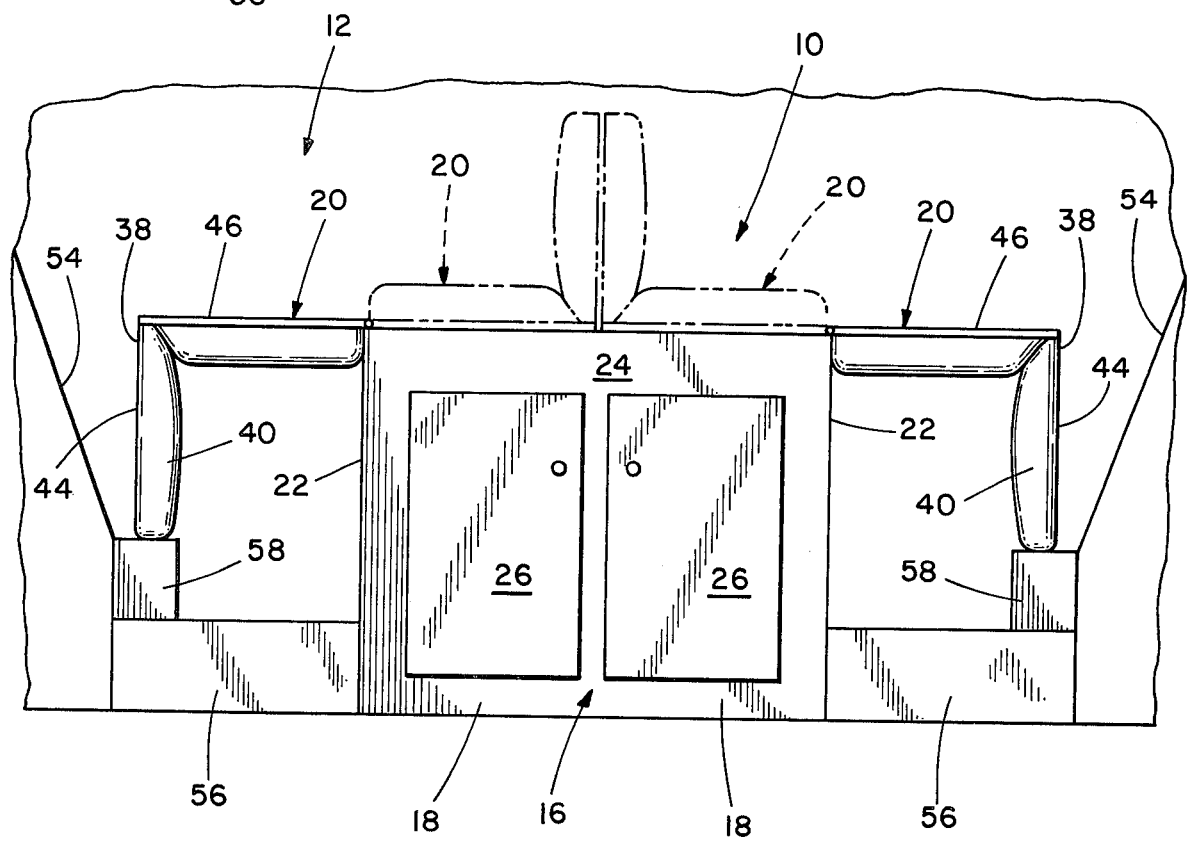
FIG. 2 is a side elevational view of the assembly of FIG. 1 illustrating the unit with the seats pivoted downwardly in order that there may be access to the kitchen unit while the seats function as work surfaces and while the kitchen unit is functional.
Figure 4:
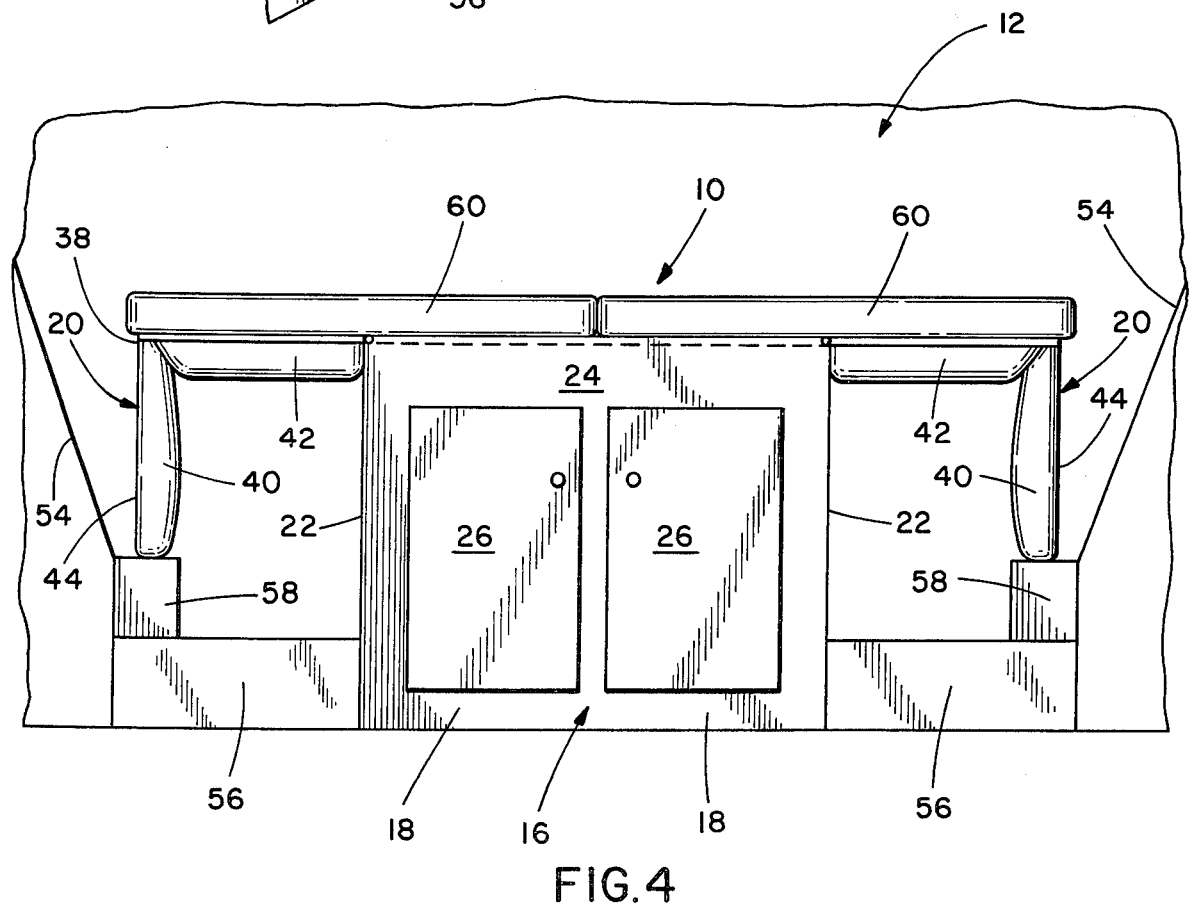
FIG. 4 is a side elevational view of the embodiment of FIGS. 1 and 3, similar to the embodiment of FIG. 2, but showing cushions on the galley unit being supported by the bottom portions of the seat and by the central support portion of the galley unit in order for the unit to function as a bed or sleeping unit.

Referring to FIGS. 3 and 4, each of the seat members 20 preferably is defined by a rigid L-shaped portion 38. Seat back cushions 40 and seat bottom cushions 42 are secured to the rigid L-shaped portion. Preferably, the cushions 40 and 42 are permanently connected to the inner portions of the L-shaped, rigid seat portion 38. As seen best in FIG. 3, each L-shaped portion 38 generally includes a substantially vertical portion 44 and a substantially horizontal portion 46. The pivot edge of the horizontal portion 46, and the upper edge of each side wall 22 of the central support 16 are hingedly secured together by an elongated hinge 48, such as a piano hinge. As seen best in FIG. 2, each of the L-shaped seat portions may be pivoted from the position shown in FIG. 1, shown in dotted line in FIG. 2, to the position shown in full line position in FIG. 2 and as shown in FIGS. 3 and 4.

Referring to FIG. 1, the seat members 20 are shown when they are used as seats. In order for the seat members 20 to be in this position, the cover plate 32 is pivoted downwardly in order to cover the range 30 and the cover board 34 is pivoted downwardly to fill the recess above the sink 28 and range 30 and to be positioned in substantial alignment with the upper edges of the front walls 24 and side wall 22. The seats are then pivoted to the position shown in dotted line view in FIG. 2, and also as shown in FIG. 1, whereat the seat members 20 are in back-to-back relationship so that persons can sit thereon when the sink 28 and range 30 are not being used.

Desirably, the galley unit 10 is placed in a recessed area of the hull 12 defined by a pair of transverse hull walls 52 and lower abutments 54. Since the sink 28 and range 30 are desirably at a conventional work level, as 30 inches above the floor, in order for a person to conveniently sit down, it is desirable to have a raised floor 56 with the foot rests on abutments 58 mounted thereon at the corners defined by the floor 56 and by the opposite side walls 52. The foot rests 58 each provide convenient support for a person's feet, when the person is sitting on the seats 20 in the position shown in FIG. 1.

In the second position of the galley unit 10, the seat members are pivoted along the hinges 48 and are moved downwardly through approximately 180°. When in the position of FIG. 3, the horizontal rigid portion 46 faces upwardly while the seat cushion 42 faces downwardly. The horizontal rigid portion 46 is on a level which is substantially equal to the upper edges of the walls 22 and 24. The vertical portion 44 abuts against the upper surface of the foot rest 58, which thereby functions to hold the horizontal portion 46 in a substantial vertical position while the vertical portion 44 acts as a vertical support. In this way, the horizontal portions 46 become work areas when the sink 28 and/or range 30 are being used. When the sink alone is being used, the cover plate 32 may be pivoted downwardly and the upper surface may be used as a drain board, or work area.

In a third position of usefulness of the galley unit 10, the cover board 34 is pivoted into the recess defined between the upper edges of the side walls 22 and front wall 24 and is at a level which is substantially equal to the level of the horizontal portions 46. As seen in FIG. 4, a pair of cushions 60 are positioned thereon so that the cushions 60 provide a cot or sleeping arrangement within the boat hull 12.

From the foregoing, it is seen that the galley unit 10 has three useful positions. The first useful position is when the unit is being used as a sink 28 and/or range 30. The second useful position is when the cover plate 32 and cover board 34 are pivoted to the closed position and when the seat members 20 are pivoted along the hinges 48 to the upright position shown in FIG. 1, when the unit provides a back-to-back seating arrangement for two persons. Thirdly, when the seat members 20 are pivoted downwardly, and when the cover plate 32 and cover board 34 are placed downwardly, the cushion 60 may be placed thereon and provide a cot or bed arrangement for a person. It is thus seen that all the objects previously set forth have been accomplished. A highly useful, simply constructed, multi-purpose galley unit is provided for use where space is at a premium, such as in boats, trailers, camper-trailers, reacreational vehicles, and the like.

While in the foregoing, there has been provided a detailed description of a particular embodiment of the present invention, it is to be understood that all equivalents obvious to those having skill in the art are to be included within the scope of the invention as claimed.

What I claim and desire to secure by Letters Patent is:

1. In a boat having a hull with a floor, the improvement of a multipurpose galley assembly which includes a storage enclosure and which is convertible from a galley to furniture for sleeping and to furniture for seating, said assembly comprising, in combination:
   a. an upright base mounted on the floor of the hull, said base having an upper portion and a lower portion with at least one side,
   b. abutments in the floor of the hull on opposite lateral sides of the base, distinct from said one side,
   c. a kitchen galley unit located in said upper portion of said base and being at a work level height, said lower portion defining a storage space below said kitchen galley unit and having access from said one side,
   d. a cover unit hingedly connected to the upper portion of said base, said cover unit having a first position for covering said kitchen galley unit and for supporting a person in a seated position and having a second position for defining work areas adjacent to and on opposite lateral sides of said kitchen galley unit and furniture for sleeping, said cover unit comprising:
   1. a pair of seats, each seat having a seat bottom with a front edge and a seat back with top edge, said bottom and back being connected at substantially right angles to each other, each seat also including a horizontal work surface portion defining the seat bottom, each of said seats being hingedly connected at said front edge to one of the opposite lateral edges of said base, each of said seats being pivotal to the first position about the seat hinge connection to cover a portion of the top of the kitchen galley unit with each of said seat backs being at a substantially upright position for supporting a person's back, said seat backs being in back-to-back relationship to each other when said cover unit in the first position; and each of said seats pivotal to the second position about the hinge connection, each of said seat backs defining upright supports for the work surface portions by cooperative engagement of the top edge of each seat back with each abutment in the floor of the hull to hold each of said horizontal work surface portions in a substantially horizontal position on opposite lateral sides of said kitchen galley unit; and 2. a separate cover member hingedly connected to the back edge of said base and covering said kitchen galley unit below said seat bottoms when in said first position, and defining a continuous surface with each of said horizontal work surface portions of said seats when said seats are moved to the second position to provide a sleeping surface, and pivotal from the kitchen galley unit when the seats are in the second position to provide a kitchen galley unit with lateral work surface portions.

2. The galley assembly of claim 1 wherein said kitchen unit comprises a sink and a range.

* * * * *